Figure 1:
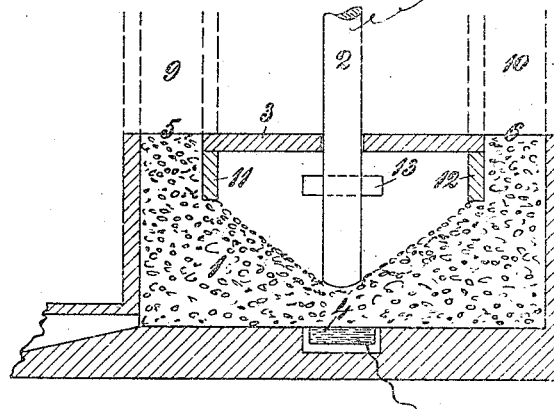

UNITED STATES PATENT OFFICE.

EDVIN ANDREAS JOHANSSON, OF TROLLHÄTTAN, SWEDEN, ASSIGNOR TO SOCIÉTÉ ANONYME METALLURGIQUE PROCEDES DE LAVAL, OF BRUSSELS, BELGIUM.

PROCESS OF EXTRACTING ZINC FROM ITS ORES.

1,256,802.     Specification of Letters Patent.     Patented Feb. 19, 1918.

Application filed March 22, 1912. Serial No. 685,528.

*To all whom it may concern:*

Be it known that I, EDVIN ANDREAS JOHANSSON, a subject of the King of Sweden, residing at Trollhättan, in the Kingdom of Sweden, have invented certain new and useful Improvements in Processes of Extracting Zinc from Its Ores, of which the following is a specification.

It has hitherto been proposed to extract zinc from zinc ores or from zinc oxid in electric furnaces by introducing the charge in the form of a stack in the furnace, and subjecting the surface of the stack to the radiation from an electric arc; fresh material being introduced from the back of the stack so that the material is pushed forward in accordance with the consumption of its surface. It has been shown that the principal advantage of this method consists in the fact that the carbonaceous gases developed in the comparatively cool parts of the interior of the stack, are, in their escape, heated increasingly so that upon reaching the surface of the stack, they attain such a high temperature, that in the presence of excessive amounts of carbon they do not contain any carbon dioxid. In ordinary metallurgical processes this fact must be regarded as a great inconvenience rather than an advantage, since, when the gases escape from the furnace at a very high temperature, the thermal effect is diminished. Moreover as a certain proportion of the carbon dioxid is reduced to carbon monoxid a great amount of heat as well as of carbon is consumed. In the special case mentioned however the process is necessary, as otherwise the zinc vapors in the presence of carbon dioxid would oxidize according to the equation

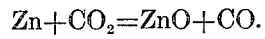
$$Zn + CO_2 = ZnO + CO.$$

Even a very small amount of $CO_2$ causes a very low production of metallic zinc as it establishes an oxidation of the surfaces of the condensed zinc particles, thereby producing zinc dust or so-called "poussiere".

According to the present invention it is possible to augment the thermal effect very considerably and to this end the process is carried out in an electric furnace, the charge introduced containing such an amount of carbon that the carbon dioxid which is first formed in the charge becomes heated to such an extent as to be reduced to carbon monoxid before escaping from the furnace. This is effected by providing an open space in the furnace above the hottest part of the surface of the charge and arranging the gas outlet in this space; the charge adjacent to this open space being sufficiently hot and containing just sufficient carbon to cause all the carbon dioxid formed in the charge to be reduced to carbon monoxid during the passage of the gas from the interior parts to the surface of the charge adjoining the open space.

An important feature of the present invention is that the gases of reduction penetrate successively the hotter parts of the charge before escaping from the furnace.

In the accompanying drawing two embodiments of a furnace, to which the present invention is applied, are illustrated in vertical section.

In Figure 1 a shaft furnace is shown, in the furnace chamber 1 of which the electrode 2 projects through the furnace top 3. The second electrode 4 is arranged in the furnace bottom. To the openings 5 and 6 the shafts 9 and 10 are connected, and through these openings the charge is introduced into the furnace-chamber 1. In order to avoid the furnace being completely filled with the charge and to enable the gas outlet 13 being arranged in the neighborhood of the hottest part of the furnace, baffle walls 11, 12 depending from the top 3, are provided, which admit a free space to be established in the furnace in which the gas outlet 13 is arranged. The walls 11, 12 are arranged in such a manner that they inclose the hottest part of the charge surface and thus cause the formation of an open space at this point. Thus there is no surface of the charge adjoining this open space which is cool enough to permit gases escaping from such surface to contain carbon dioxid. The carbon dioxid gases developed in the cooler parts of the charge, are thus compelled to move from the cooler parts to the hotter parts of the charge, so that they may be heated to a temperature, sufficiently high to convert them into carbon monoxid, in which form the gases escape.

Figure 2:
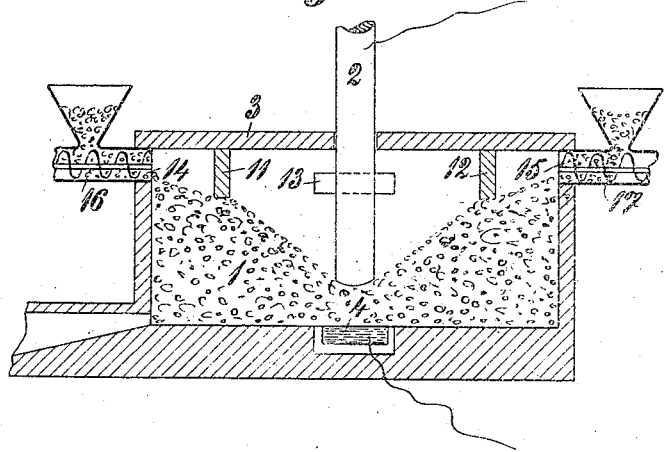

Fig. 2 shows another construction of a furnace in which propelling screws are employed for introducing the charge.

As in the previous example 1 indicates the furnace chamber, 2 the top electrode, and 4 the bottom electrode. Through one or more openings 14, 15 in the furnace wall, the charge is continuously introduced by means of propelling screws or the like 16, 17, whereby, when the electrodes are placed in the center of the furnace, as shown, the walls 11, 12 prevent the furnace from becoming completely filled with the charge. Also in this construction the carbon dioxid passes from the cooler parts to the hotter parts of the furnace, where it is reduced into carbon monoxid.

In both constructions the charge is introduced and the gases escape in such a manner, that the gases are compelled to move in the same direction as the charge and to pass through increasingly hotter parts of the charge, before escaping from the furnace.

What I claim and desire to secure by Letters Patent of the United States is:—

The method of extracting zinc from its ores, which consists in introducing into an electric resistance furnace a charge containing sufficient carbon to combine with the oxygen of the ore to form carbon monoxid, passing an electric current through a portion of said ore to produce various degrees of heat in different parts of said ore, causing the carbon dioxid formed in the cooler parts of the charge to successively penetrate the hotter parts of the ore whereby the remaining unaltered carbon will reduce it to carbon monoxid.

In testimony whereof I affix my signature in presence of two witnesses.

EDVIN ANDREAS JOHANSSON.

Witnesses:
 VERNER SVANTESON,
 HUGO LINDBORN.